(12) United States Patent
Hübner

(10) Patent No.: US 10,359,125 B2
(45) Date of Patent: Jul. 23, 2019

(54) FLOW CONTROL DEVICE

(71) Applicants: Bürkle GmbH, Bad Bellingen (DE); Anna Henning, Lörrach-Brombach (DE)

(72) Inventor: Peter Hübner, Lörrach (DE)

(73) Assignee: Bürkle GmbH, Bad Bellingen (DE)

( * ) Notice: Subject to any disclaimer, the term of this patent is extended or adjusted under 35 U.S.C. 154(b) by 0 days.

(21) Appl. No.: 15/564,606

(22) PCT Filed: Apr. 8, 2016

(86) PCT No.: PCT/EP2016/057822
§ 371 (c)(1),
(2) Date: Oct. 5, 2017

(87) PCT Pub. No.: WO2016/162516
PCT Pub. Date: Oct. 13, 2016

(65) Prior Publication Data
US 2018/0094743 A1 Apr. 5, 2018

(30) Foreign Application Priority Data
Apr. 10, 2015 (DE) .......................... 10 2015 004 691

(51) Int. Cl.
*F16K 31/08* (2006.01)
*B67C 11/06* (2006.01)
(Continued)

(52) U.S. Cl.
CPC ............ *F16K 31/084* (2013.01); *B67C 11/04* (2013.01); *B67C 11/06* (2013.01); *F16K 31/086* (2013.01); *B67C 3/28* (2013.01)

(58) Field of Classification Search
CPC ..... F16K 31/084; F16K 31/086; B67C 11/04; B67C 11/06; B67C 3/28
(Continued)

(56) References Cited

U.S. PATENT DOCUMENTS 59,034 A * 10/1866 Keene .................... B67D 7/348
141/94
2,405,127 A * 8/1946 Beach ................... F16K 31/086
137/883
(Continued)

FOREIGN PATENT DOCUMENTS

DE 2932459 A1 2/1981
DE 3028938 A1 2/1981
(Continued)

OTHER PUBLICATIONS

International Search Report for corresponding PCT/EP2016/057822 dated Jul. 25, 2016.

*Primary Examiner* — Umashankar Venkatesan
(74) *Attorney, Agent, or Firm* — Pearne & Gordon LLP

(57) ABSTRACT

A flow control device includes a flow channel composed of non-magnetic material having a center axis, a first length segment having a first diameter, a second length segment, wherein the flow channel expands conically from the first diameter to a second diameter in the second length segment, and a third length segment; a magnetic closing ball, which is movably arranged in the second and third length segments and has a ball diameter that lies between the first and the second diameters; a first, axially polarized (north-south) ring magnet, which is oriented centrally in the center axis and is arranged so as to be longitudinally movable along the center axis and has an inside diameter that is greater than the outside diameter of the flow channel in the third length segment; and a preloading device, which axially pushes the north-south-polarized first ring magnet toward the first length segment.

18 Claims, 12 Drawing Sheets

(51) Int. Cl.
*B67C 11/04* (2006.01)
*B67C 3/28* (2006.01)

(58) Field of Classification Search
USPC .......................................................... 251/65
See application file for complete search history.

(56) References Cited

U.S. PATENT DOCUMENTS

| | | | | |
|---|---|---|---|---|
| 3,026,903 | A * | 3/1962 | Roach | F16K 15/04 137/533.13 |
| 3,109,504 | A | 11/1963 | Cramer | |
| 3,233,625 | A * | 2/1966 | Pase | F16K 31/086 137/416 |
| 3,447,776 | A * | 6/1969 | Blumer | F16K 31/02 251/129.1 |
| 4,349,042 | A * | 9/1982 | Shimizu | F16K 17/36 137/39 |
| 5,004,454 | A * | 4/1991 | Beyar | A61F 2/0022 128/DIG. 25 |
| 5,758,863 | A * | 6/1998 | Buffet | F16K 31/086 251/28 |
| 6,131,877 | A * | 10/2000 | Kerger | F16K 1/301 137/533.11 |
| 8,215,335 | B2 * | 7/2012 | Barnham | E03C 1/242 137/411 |
| 2006/0290758 | A1 * | 12/2006 | Busch | B41J 2/17523 347/86 |
| 2007/0246672 | A1 * | 10/2007 | Sabiron | F16K 31/086 251/129.15 |
| 2010/0096571 | A1 * | 4/2010 | Webster | F16K 3/265 251/65 |
| 2016/0297662 | A1 * | 10/2016 | Baumgartner | B67C 3/286 |

FOREIGN PATENT DOCUMENTS

| | | |
|---|---|---|
| DE | 10130808 A1 | 4/2002 |
| DE | 20 2014 006 491 U1 | 9/2014 |
| EP | 1281016 A1 | 2/2003 |
| JP | S5620883 A | 2/1981 |
| JP | S6131780 A | 2/1986 |
| JP | 2005164025 A | 6/2005 |

* cited by examiner

ERSATZBLATT (REGEL 26)

ERSATZBLATT (REGEL 26)

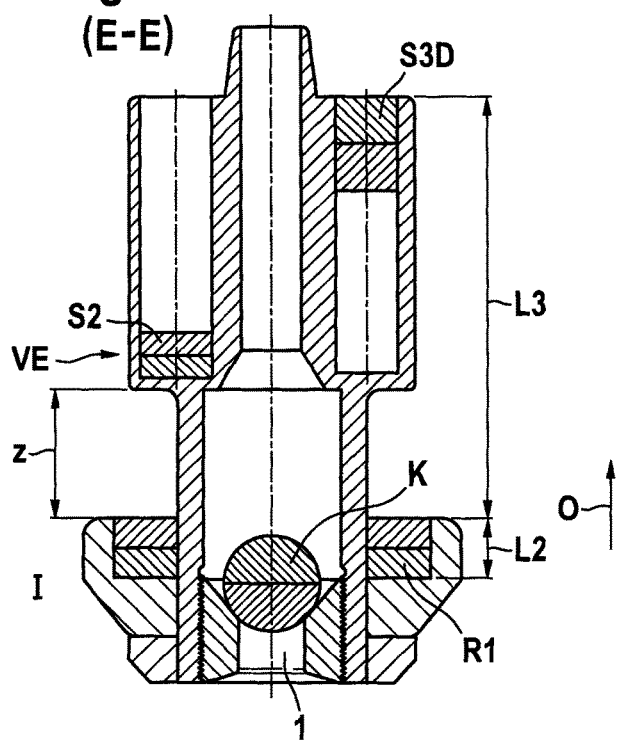
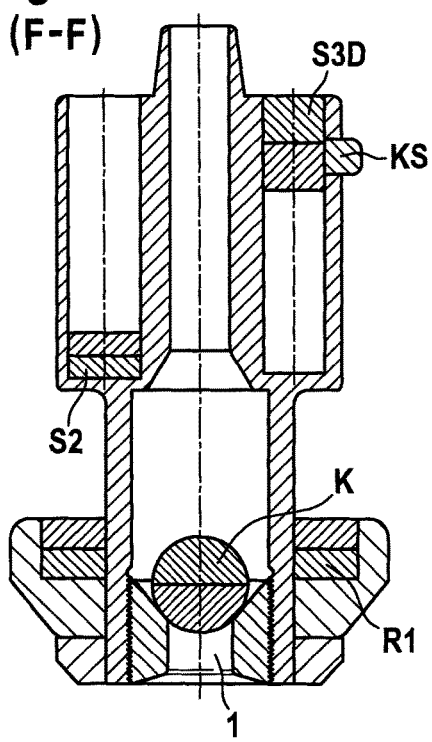
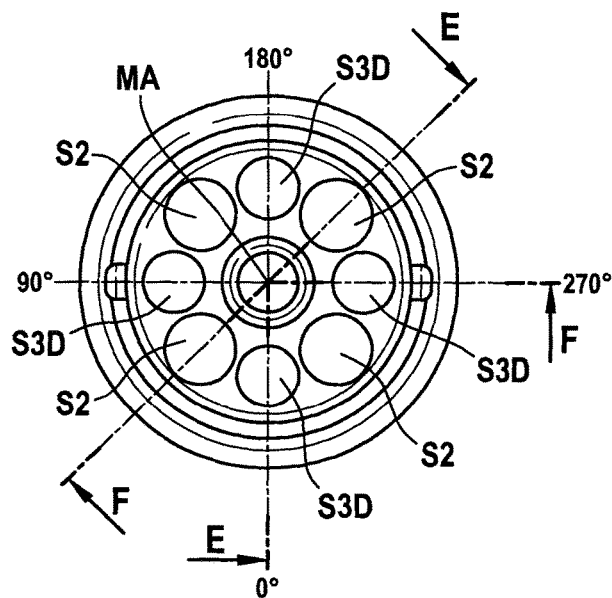

ERSATZBLATT (REGEL 26)

FLOW CONTROL DEVICE

This application is a National Stage application of PCT international application PCT/EP2016/057822, filed on Apr. 8, 2016 which claims the priority of German Patent Application No. 102015004691.8, filed with the German Patent Office on Apr. 10, 2015, both of which are incorporated herein by reference in their entirety.

FIELD OF THE INVENTION

The present invention relates to a flow control device.

BACKGROUND OF THE INVENTION

It is not always possible when handling liquids, for example in testing laboratories and during sampling for the purpose of quality control and similar applications, to prevent loss of material due to overflow or overdosing. During filling and decanting operations, liquids are spilled which require cleaning effort that causes more or less problems depending on the quality of the liquids. In general, funnel devices are the customary tools used when decanting. They are available as simple funnels, such as are known from household use, as well as, for example, so-called bottle top dispensers (e.g. by the Bürkle company, Bad Bellingen). Commercially available, so-called all-purpose funnels generally have an unobstructed outflow, i.e. it is not possible to selectively shut off a liquid in the funnel container. The liquid runs out until the funnel is empty. To prevent this, during filling operations, an operator must hold the container to be filled, while he or an assistant simultaneously operates the spigot of the dispensing container. There is a risk in this case of losing liquid due to spillage.

Specified workflows as part of quality assurance and within testing laboratories also include manual activities in the form of simple filling operations which require particular dexterity. Attention should also be paid to the safety aspect when decanting "critical", that is to say hazardous liquids, e.g. leaches or acids. Customary funnels have no shutoff function for keeping the liquid in the funnel or metering it from the funnel in the event that the decanting process needs to be stopped.

BRIEF SUMMARY OF THE INVENTION

The present invention is based on the object of proposing a flow control device which avoids or at least greatly diminishes the drawbacks known in prior art.

The object is achieved by a flow control device according to claim 1, namely a flow control device, which is characterized by
a) a flow channel composed of non-magnetic material having a center axis, with
  aa) a first length segment having a first diameter,
  ab) a second length segment, wherein the flow channel expands conically from the first diameter to a second diameter in the second length segment, and
  ac) a third length segment,
b) a magnetic closing ball, which is movably arranged in the second and third length segments and has a ball diameter that lies between the first and the second diameters,
c) a first, axially polarized (north-south) ring magnet, which is oriented centrally in the center axis and is arranged so as to be longitudinally movable along the center axis and has an inside diameter that is greater than the outside diameter of the flow channel in the third length segment,
d) a preloading device, which axially urges the north-south-polarized first ring magnet (NSRM) toward the first length segment.

With the flow control device according to the invention, it is advantageously possible to prevent overflow or overdosing of liquids due to the magnetically controlled shutoff device. The novel device supports the filling operations and helps to prevent loss of material without modifying workflows. It can be used regardless of location, e.g. on portable containers and equipment. The magnetically controlled shutoff device according to the invention operates completely without current and therefore requires no power or battery connection which is an advantage for ambulant use. The flow control device according to the invention can be fitted to canisters and reservoir bottles with spigot. One-handed operations are also conceivable. Attachment of the flow control device according to the invention, e.g. on the outlet of a space-saving jerrycan or a pump makes it easier to handle this equipment.

In an advantageous embodiment of the invention, the preloading device of the flow control device is designed as an axial compression spring. The axial compression spring can be a spiral spring which simply winds around the flow channel and terminates in attached end coils and is arranged in such a manner that it rests on the device. If the first ring magnet is moved against the axial pressure of the axial compression spring, which is supported on the flow control device in the region of the third length segment, from the second length segment toward the third length segment, then as a result of the interaction between the magnetic forces of ring magnet and ball magnet, the ball moves out of its position in the center axis and runs axially and radially outwards on the conical surface and in the process opens the previously closed first length segment. The connecting passage from the first to the third length segment of the flow channel is opened, the liquid can flow as long as the first ring magnet is held in this position. If the first ring magnet is allowed to move back again, the force of the axial compression spring urges it back into its starting position again, in so doing it "carries" the magnetic closing ball along with it again and as a result shuts off the flow channel. The closing ball then sits once again in the conical seat at the transition from the first to the second length segment of the flow channel.

In a further advantageous embodiment of the invention, the preloading device of the flow control device is designed as a reverse-axially-polarized second (south-north) ring magnet (SNRM), which is oriented centrally to the first ring magnet on the center axis (M). The advantageous effect achieved in this case is realised in that the two ring magnets repel each other and act in the manner of a (pretensioned) axial compression spring, as just described.

In yet a further advantageous embodiment of the invention, the preloading device of the flow control device is designed as an axially-polarized third (north-south) ring magnet (NSRM), which is supported on the flow channel and is oriented centrally on the center axis (M), a spacer being arranged between the two attracting ring magnets. In this case, the third ring magnet is located axially, essentially in the region of the first length segment of the flow channel. This construction has the advantage that the third ring magnet can be arranged at a fixed distance in such a manner from the conical seat, in which it holds the first ring magnet in a position relative to the conical seat, in which the closing ball is in the closed position. If, in this embodiment, the first ring magnet is moved toward the third length segment, the closing ball, which is located in a position II (described in greater detail below), will leave the center axis axially and radially—since it is no longer centred and axially fixed by the conical seat—and will open the flow channel.

In the previously mentioned and described advantageous embodiments or variants of the flow control device according to the invention, the closing ball is "dragged along", as it were, by the first ring magnet. Due to its present "position in unstable equilibrium", it is only possible in theory to achieve the basically balanced position of the closing ball in the center axis without additional auxiliary means. The conical seat, which centers the closing ball at the transition between the first and the second length segment of the flow channel, serves here as the present auxiliary means. If the magnetic forces acting from the first ring magnet on the closing ball and the geometry of the conical second length segment of the flow channel permit radial removal of the closing ball from the center axis, then the flow channel is opened.

There are three stable axial positions in relation to the first ring magnet for the closing ball which is held radially in the center axis, —that is, with radial deflections exerted but "inhibited" by radial forces—namely a first position (referred to as "position I") in the center plane of said ring magnet, and in both axial directions a second position (referred to as "position II") in each case which is axially distanced from the center plane, the distance of the ball from the center plane of the first ring magnet in position II resulting due to the relationship between the magnetic flux densities of ring magnet and magnetic closing ball.

In yet another advantageous embodiment of the invention, the flow control device is configured in such a manner that the flow channel in the conical second length segment is designed inside as a soft ball sealing seat for the magnetic closing ball. This has the advantage of achieving a reliable tight closure of the flow control device. The ball sealing seat can be designed, as it were, as an annular lip seal of a correspondingly appropriate material.

The invention also includes a filling funnel which is characterized by a flow control device according to the invention according to one of claims 1 to 5. A filling funnel designed in such a manner enables arbitrarily accurate and clean simple filling and decanting of liquids, while metering thereof can be carried out very easily.

In an advantageous embodiment of the filling funnel according to the invention, the filling funnel is provided with a scale indicating the filling level of the funnel.

This makes it very easy to implement accurate metering.

In a further advantageous embodiment of the filling funnel according to the invention, the filling funnel has a centering device for container connections. Using the centering device, the components, filling funnel and container to be filled, which are to be coupled for filling, are stabilized thus increasing safety during filling or decanting.

The invention also includes a spigot which is characterized by a flow control device according to the invention according to one of claims 1 to 5. The advantage of this embodiment according to the invention is obvious. The spigot according to the invention does not require any rotating part, it merely has an axially displaceable actuating element, namely the longitudinally displaceable first ring magnet which controls the closing ball.

In yet another advantageous embodiment of the invention, the flow control device is configured in such a manner that the preloading device is designed as at least two first (south-north) bar magnets, supported on the flow channel, which are grouped around the center axis and reverse-axially-polarized in relation to the first ring magnet. This design variant advantageously permits the use of other magnet shapes which in turn expands the freedom for designing the flow control device in the third length segment.

In yet another advantageous embodiment of the invention, the flow control device is characterized in that, a first half of a bayonet mount, in the form of a rotary ring, which is directed away from the first length segment, is arranged in the third length segment and that four evenly spaced to each other second bar magnets with alternating north-south orientation, supported on the flow channel, are arranged in the rotary ring around the center axis, and that the rotary ring has at least one link pin protruding radially outwards from its periphery. Thus the device according to the invention is advantageously designed in such a manner that it can be coupled to a connection, e.g. for extending the flow channel of a hose or tube or another connection. A particular advantage is the fact that, especially in laboratory operation, devices with smooth surfaces—as is the case with the device according to the invention—are easier to clean, for example, than the threads of a screwed connection.

In yet another advantageous embodiment of the invention, the flow control device is characterized in that, assigned to the first half is a second half of a bayonet mount, which can be releasably connected to said first half, in the form of a sleeve with at least one sliding track integrated in its wall, the sleeve having four evenly spaced to each other third bar magnets with alternating north-south orientation around its center axis, the rotary ring being dimensioned in such a manner that it fits into the interior of the sleeve of the second half, the sliding track in the wall running peripherally in a circular arc of 45° and being connected to at least one link channel extending axially from the end of the sleeve to the sliding track in the wall and merging into it, the position of the second and third bar magnets being rotated by 45° relative to each other when the at least one link channel and the at least one link pin are axially aligned. With this embodiment according to the invention, it is now advantageously possible to implement a complete bayonet mount between the first half of a magnetic closure present in the third length segment and the second half, a sleeve, which in turn can have, on its side directed away from the first half, a conventional connection for a hose or a tube or similar. For use, the rotary ring is guided to the sleeve in such a manner that the link pin can initially move into the link channel against the circumferential forces exerted by the magnets around the center axis. The axial magnetic forces then draw the rotary ring into the sleeve so that the link pin arrives in the region of the sliding track and is moved into the sliding track under the influence of the magnetic forces acting peripherally and axially. The axial forces draw the rotary ring towards the flow control device.

In a further advantageous embodiment of the invention, the flow control device is characterized in that the preloading device is designed as four first (south-north) bar magnets, supported on the flow channel, which are grouped around the center axis and reverse-axially-polarized in relation to the first ring magnet. This substantially improves the solution with two first (south-north) bar magnets explained above, since it is possible to achieve a more balanced assignment of the individual components due to the four bar magnets.

In yet a further advantageous embodiment of the invention, the flow control device is characterized in that, instead of one, it has two sliding tracks and link channels respectively integrated in its wall, which are situated opposite each other with regard to the center axis. With this solution according to the invention, it is also possible to significantly improve and balance the evenness of the force distribution and trouble-free operation of the device.

Finally, in yet another advantageous embodiment of the invention, the flow control device is characterized in that the first half of the bayonet mount and the second half, which can be releasably connected thereto, have devices for mutually centering and sealing the flow channel. This more advantageously increases operating reliability and simplifies handling. At the same time, an O-ring seal or a lip seal made of appropriate material can also be used.

BRIEF DESCRIPTION OF THE DRAWINGS

Further advantageous embodiments of the invention emerge from the following description. To facilitate the understanding, the invention will now be briefly described by way of example embodiments with the aid of a drawing.

FIG. 11 is a greatly simplified diagrammatic view of a further embodiment of the flow control device according to the invention, which is similar to the illustration in FIG. 1—but, compared to FIG. 1, in this case is "upside down" and with bar magnets—in the position with the flow channel closed by the ball as section E-E according to FIG. 13.

FIG. 12 is a greatly simplified diagrammatic view of the illustration in FIG. 11 as section F-F according to FIG. 13.

FIG. 13 is a plan view of the illustrations according to FIGS. 11 and 12 as well as the position of the section lines E-E and F-F of FIGS. 11 and 12.

DESCRIPTION OF EXAMPLE EMBODIMENTS

Note: For the whole description here present, when mentioning magnetic polarizations of magnets which are combined with each other, e.g. a north-south polarization is coupled with a south-north polarization (repulsion), the combination of a south-north polarization with a north-south polarization also applies equivalently. This also applies analogously to the case of combining a south-north polarization with a south-north polarization (attraction) and vice versa.

Figure 1:
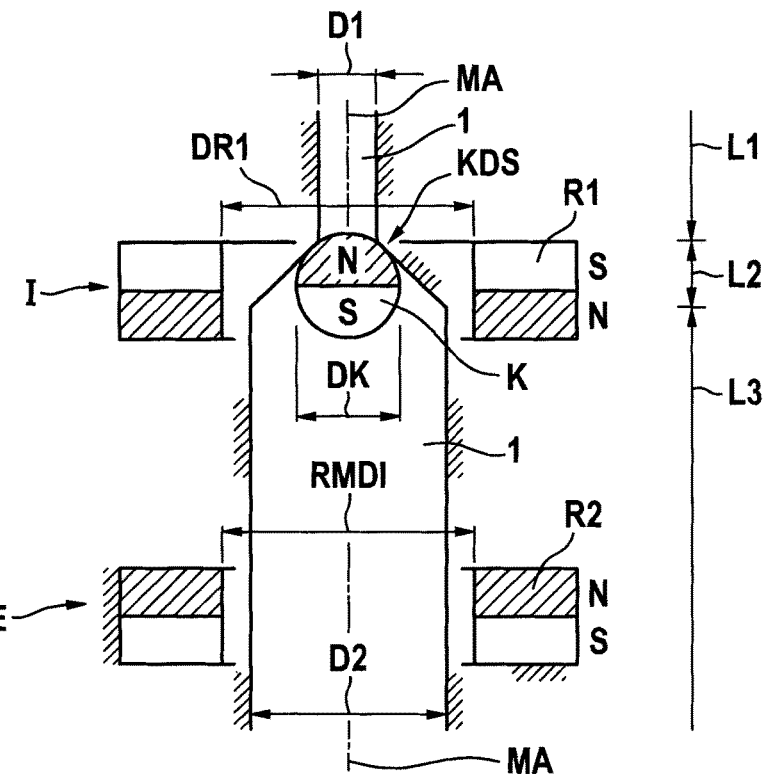
FIG. 1 is a greatly simplified sectional view of a first embodiment of the flow control device according to the invention with the flow channel closed.

The flow control device outlined schematically in FIG. 1 has a flow channel 1 composed of non-magnetic material having a center axis MA. The flow channel 1 is divided into three length segments L1, L2 and L3. The first length segment has a first diameter D1. The second length segment extends in a widening cone to the third length segment L3, wherein the flow channel 1 expands conically from the first diameter D1 to a second diameter D2 in the second length segment L2. A magnetic closing ball K, which is movably arranged in the second and third length segments L2, L3, has a ball diameter DK that lies between the first and the second diameters D1, D2. At the level of the magnetic closing ball K, a first, axially polarized (north-south) ring magnet R1, which is oriented centrally in the center axis MA and is arranged so as to be longitudinally movable along said center axis and has an inside diameter DR1 that is greater than the outside diameter of the flow channel 1, is shown in the third length segment L3. A preloading device VE, which axially urges the north-south (N-S) polarized first ring magnet R1 toward the first length segment L1, is shown in the form of a south-north-polarized second ring magnet R2 which magnetically repels the first ring magnet. This function could equally be taken over by an axial compression spring not shown here. The flow channel 1 and the second ring magnet R2 are partially provided with short hatching strokes / / / / / to indicate that both are fixedly arranged in relation to each other. The first ring magnet R1 draws the closing ball K magnetically into the position I shown in which said closing ball tightly closes the flow channel 1 in a ball sealing seat KDS.

Figure 2:
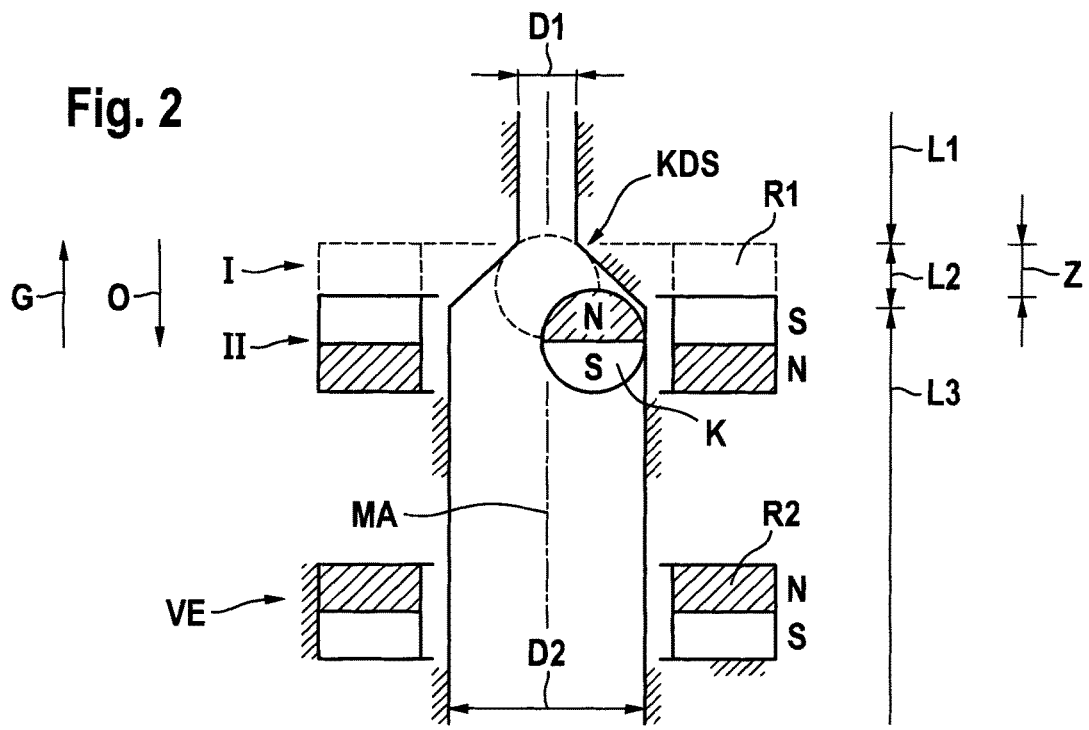
FIG. 2 is a greatly simplified sectional view of the first embodiment according to FIG. 1 with the flow channel opened.

If the first ring magnet R1 is now moved into the position II (FIG. 2) in the direction of the O arrow ("open") against the magnetic force of the second ring magnet R2 repelling it, then it takes the closing ball K with it and the flow channel 1 is opened. During the above-described displacement of the ring magnet R1 from position I to position II, said ring magnet releases the closing ball K from the ball sealing seat KDS. The closing ball K can drift radially outwards in the second length segment L2 of the flow channel 1, since it is no longer held by the centering geometry of the ball sealing seat KDS and by the force of the first ring magnet R1, which is now no longer located in position I. FIG. 2 illustrates the displacement of the first ring magnet R1 by the distance Z in the direction of the arrow G from the position I indicated by the dashed line into the position II drawn with an unbroken line. The same applies to the closing ball K. The polarization of the magnets is indicated in each case by the hatched portion "N" (i.e. north) and the unhatched portion "S" (i.e. south). This meaning applies to the whole of the present description. A backward movement of the first ring magnet R1 into the position I results in the flow channel 1 being closed again, since the closing ball K also assumes its position I again while doing so.

Figure 3:
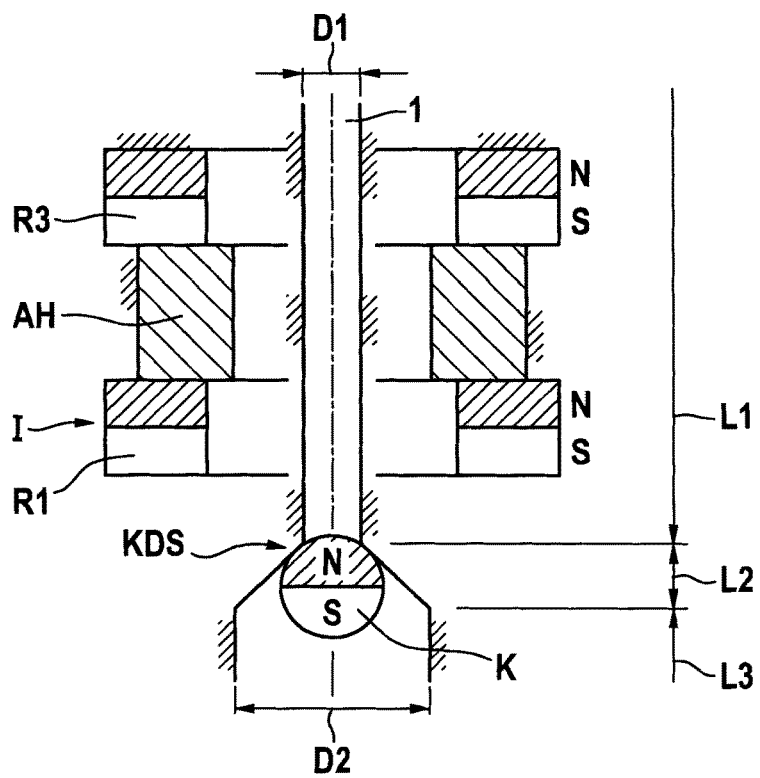
FIG. 3 is a greatly simplified sectional view of a second embodiment of the flow control device according to the invention with the flow channel closed.
Figure 4:
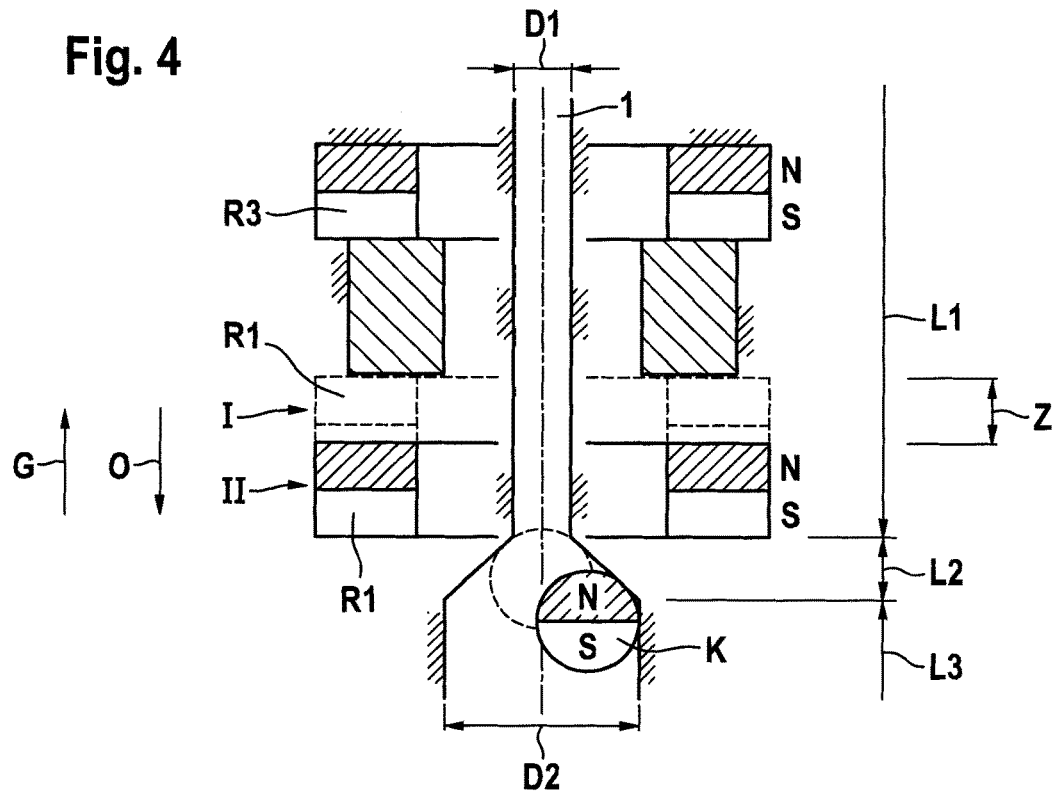
FIG. 4 is a greatly simplified sectional view of the second embodiment according to FIG. 3 with the flow channel opened.

FIGS. 3 and 4 show an alternative embodiment of a flow control device according to the invention. The details of the flow channel 1 and the first ring magnet R1 correspond to those of the embodiment described in FIGS. 1 and 2. Therefore, they will not be described again. Only the axial arrangement and the polarization of the first ring magnet R1 differ from the first variant according to FIGS. 1 and 2. As will be explained in greater detail in the description relating to FIG. 5, a quasi-stable situation exists between ring magnet and magnetic ball for a constellation of ring magnet R1 to closing ball K as shown in FIG. 3. However, ring magnet and magnetic ball (viewed axially) arrange themselves here in the same polarization NS-NS (in contrast to the embodiment according to FIGS. 1 and 2). A third ring magnet R3, which is polarized identically to the first ring magnet R1 and attracts it, is arranged spaced apart by means of a spacer AH as shown.

If the first ring magnet R1 is now moved into the position II (FIG. 4) in the direction of the O arrow ("open") against the magnetic force of the third ring magnet R3 attracting it, then it takes the closing ball K with it and the flow channel 1 is opened. During the above-described displacement of the ring magnet R1 from position I to position II, said ring magnet releases the closing ball K from the ball sealing seat KDS. The closing ball K can drift radially outwards in the second length segment L2 of the flow channel 1, since it is no longer held by the centering geometry of the ball sealing seat KDS and by the force of the first ring magnet R1, which is now no longer located in position I. FIG. 4 illustrates the displacement of the first ring magnet R1 by the distance Z in the direction of the arrow G from the position I indicated by the dashed line into the position II drawn with an unbroken line. The same applies to the closing ball K. A backward movement of the first ring magnet R1 into the position I results in the flow channel 1 being closed again, since the closing ball K also assumes its position I again while doing so.

Figure 5:
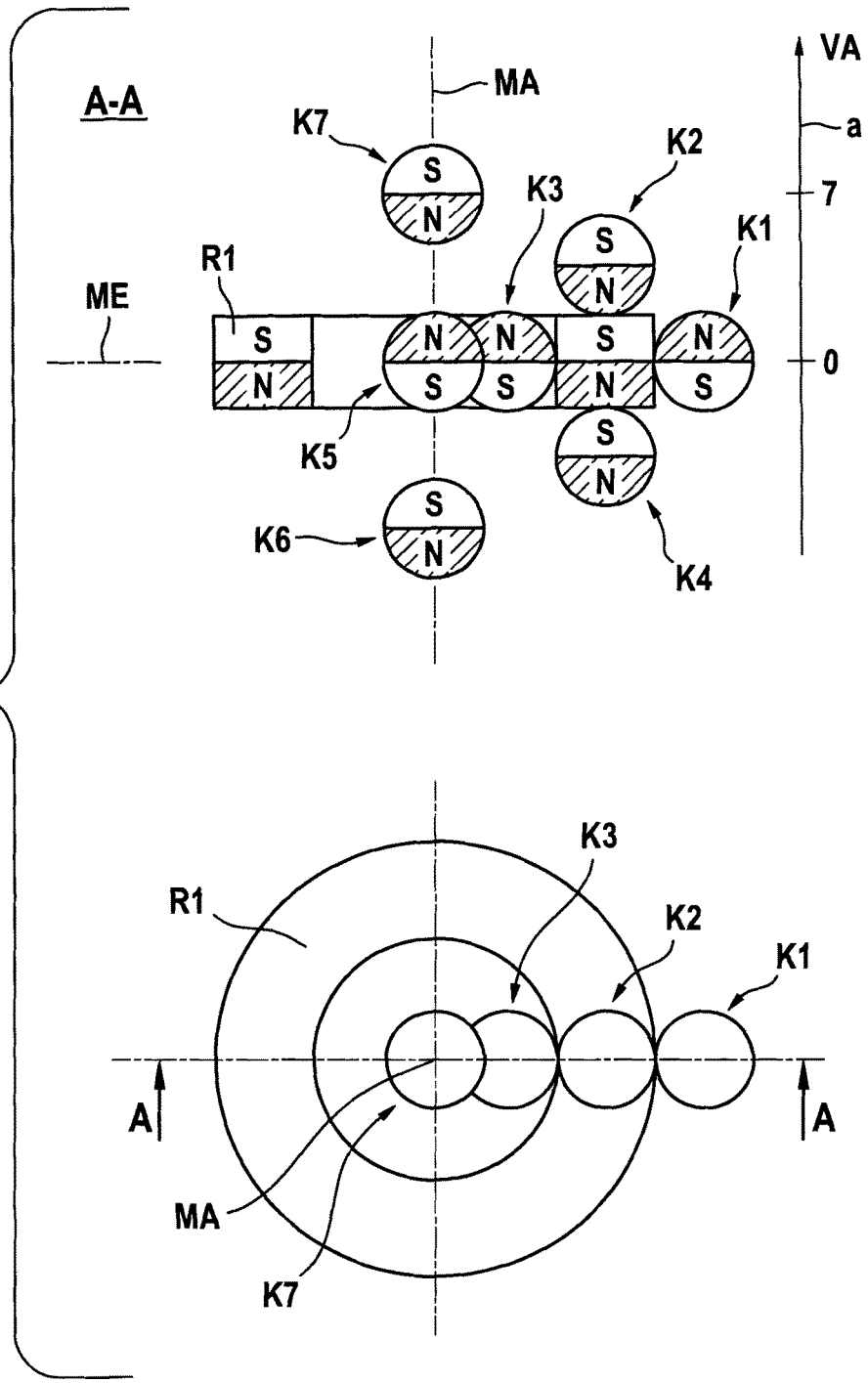
FIG. 5 is a greatly simplified sectional and plan view of the theoretically possible positions of ring magnet and closing ball/ball magnet in relation to each other in possible quasi-stable positions.

Neodymium magnets are preferably used for the flow control device according to the invention but other suitably strong magnets can also be used. FIG. 5 illustrates the possible quasi-stable situations between ring magnet and magnetic ball for the constellations of ring magnet R1 to closing ball K shown in FIGS. 1 to 4. To indicate the polarization of the magnets, the N component of the N-S polarization is always hatched dark. The seven ball positions shown here apply to the same ball. A distinction is to be made between the two embodiments AB12 (FIGS. 1 and 2, as well as FIGS. 9 and 10) and AB34 (FIGS. 3 and 4).

Figure 6:
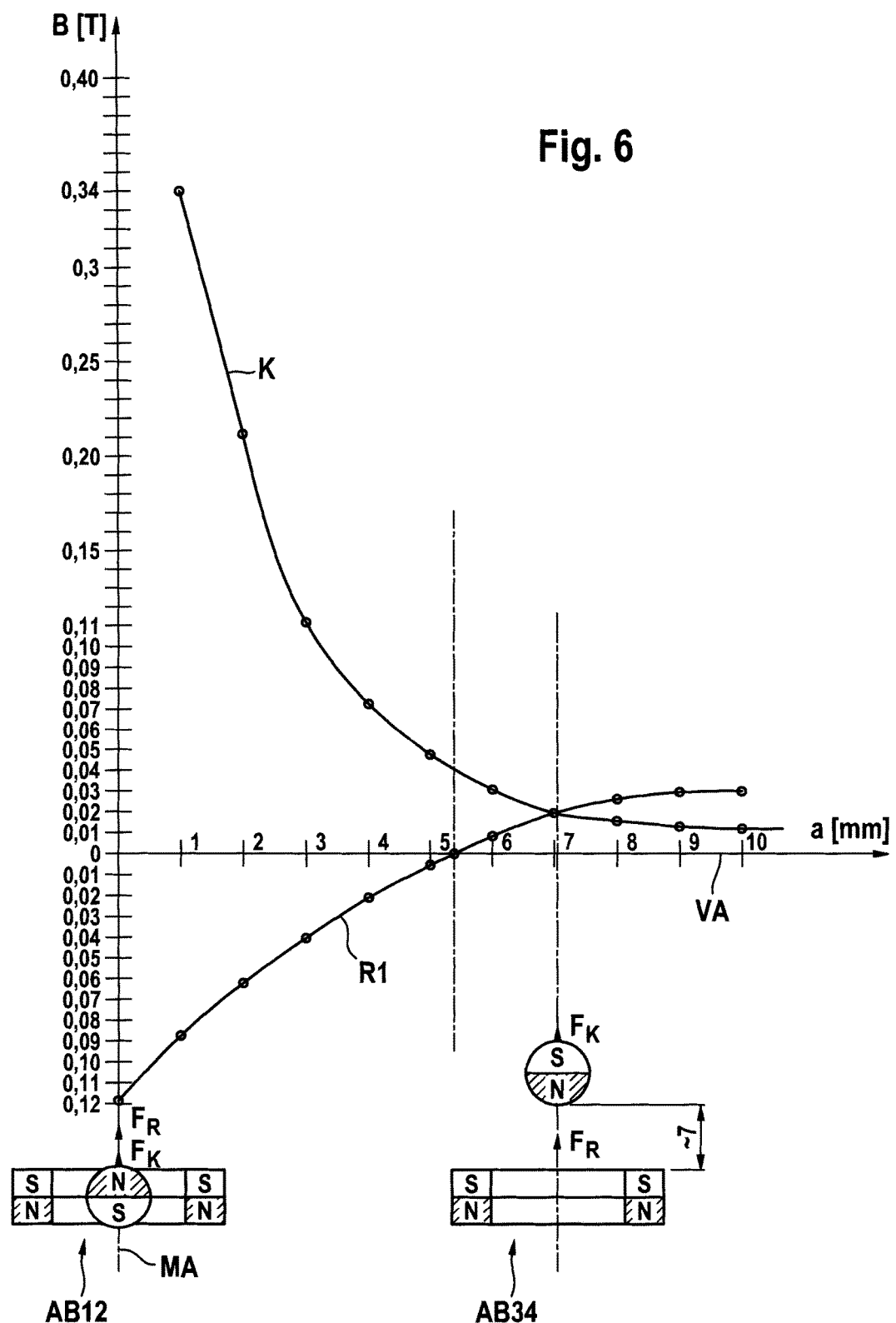
FIG. 6 is a diagram illustrating the magnetic flux density B [T] and its effect on positions I and II.

If the magnetic ball is allowed to move freely to the ring magnet R1, then it assumes one of the stable positions K1 to K4 as shown in FIG. 5. In this case, its polarization N-S or S-N is constant. If the magnetic ball is forced onto a path which coincides with the center axis MA, it will assume one of the three positions K5, K6 or K7 shown. In position K5, it maintains the polarization as in the positions K1 to K4, whereas in the positions K6 and K7 it reverses its polarization as shown. The positions K6 and K7, assuming the radial force component is artificially cancelled in each case, are axially stable positions. This is illustrated based on the diagram shown in FIG. 6 of the magnetic flux density B [T] in relation to the vertical distance a [mm] of the ball from the center plane ME of the ring magnet R1. In the positions K6 and K7 (a≈7 mm), the magnetic flux densities B from ring magnet to ball magnet are in equilibrium. The vertical axis VA indicates the distance of the magnetic ball from the center plane ME of the ring magnet R1.

Figure 7:
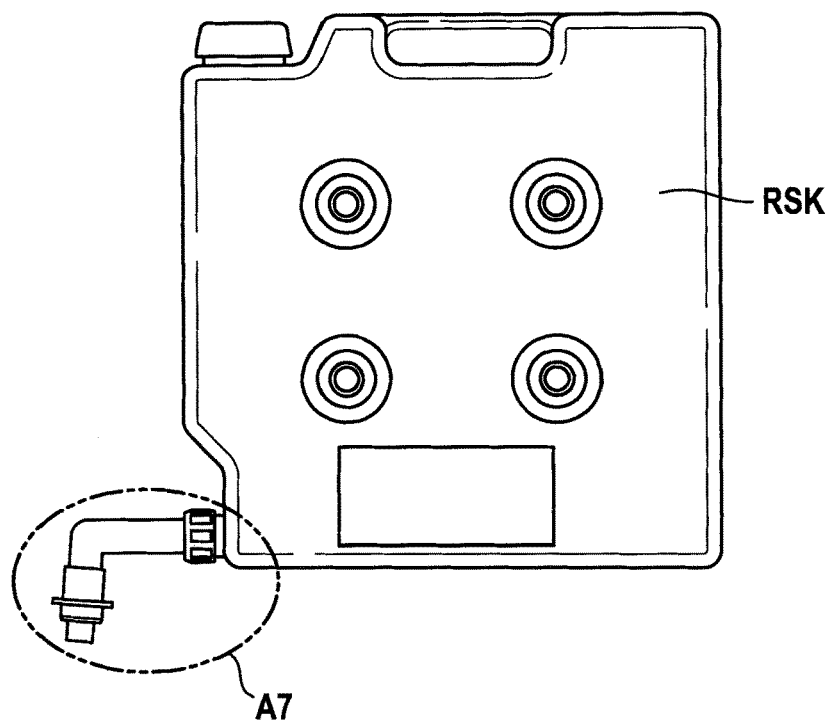
FIG. 7 is a greatly simplified detailed view of a flow control device arranged on a space-saving jerrycan.

FIG. 7 shows a space-saving jerrycan RSK, on the lower edge of which a flow control device according to the invention is arranged by way of example.

Figure 7A:
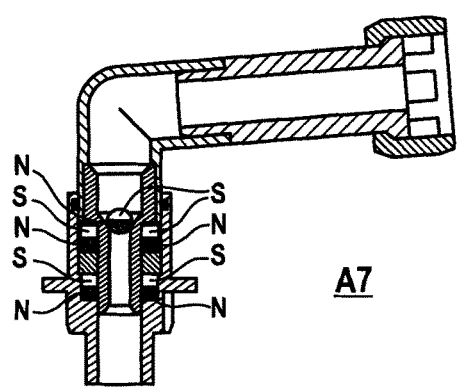

FIG. 7a shows in detail view A7 of FIG. 7, the flow control device arranged on the space-saving jerrycan.

Figure 8:
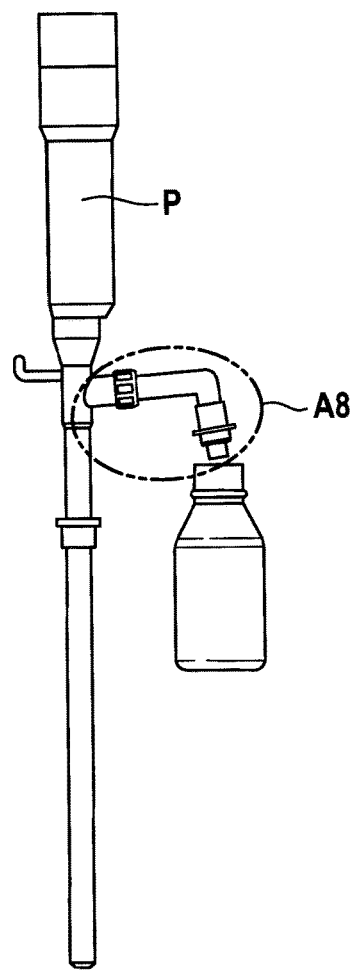
FIG. 8 is a greatly simplified detailed view of a flow control device arranged on a pump.

FIG. 8 shows a pump P, on the outlet of which a flow control device according to the invention is arranged by way of example.

Figure 8A:
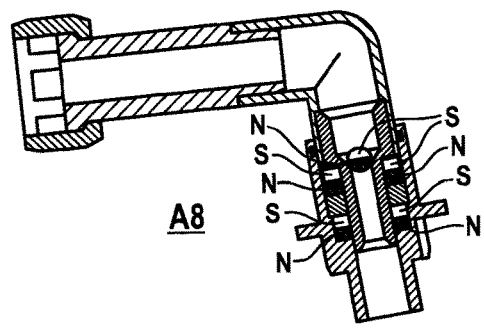

FIG. 8a shows in detail view A8 of FIG. 8, the flow control device arranged on the pump.

Figure 9:
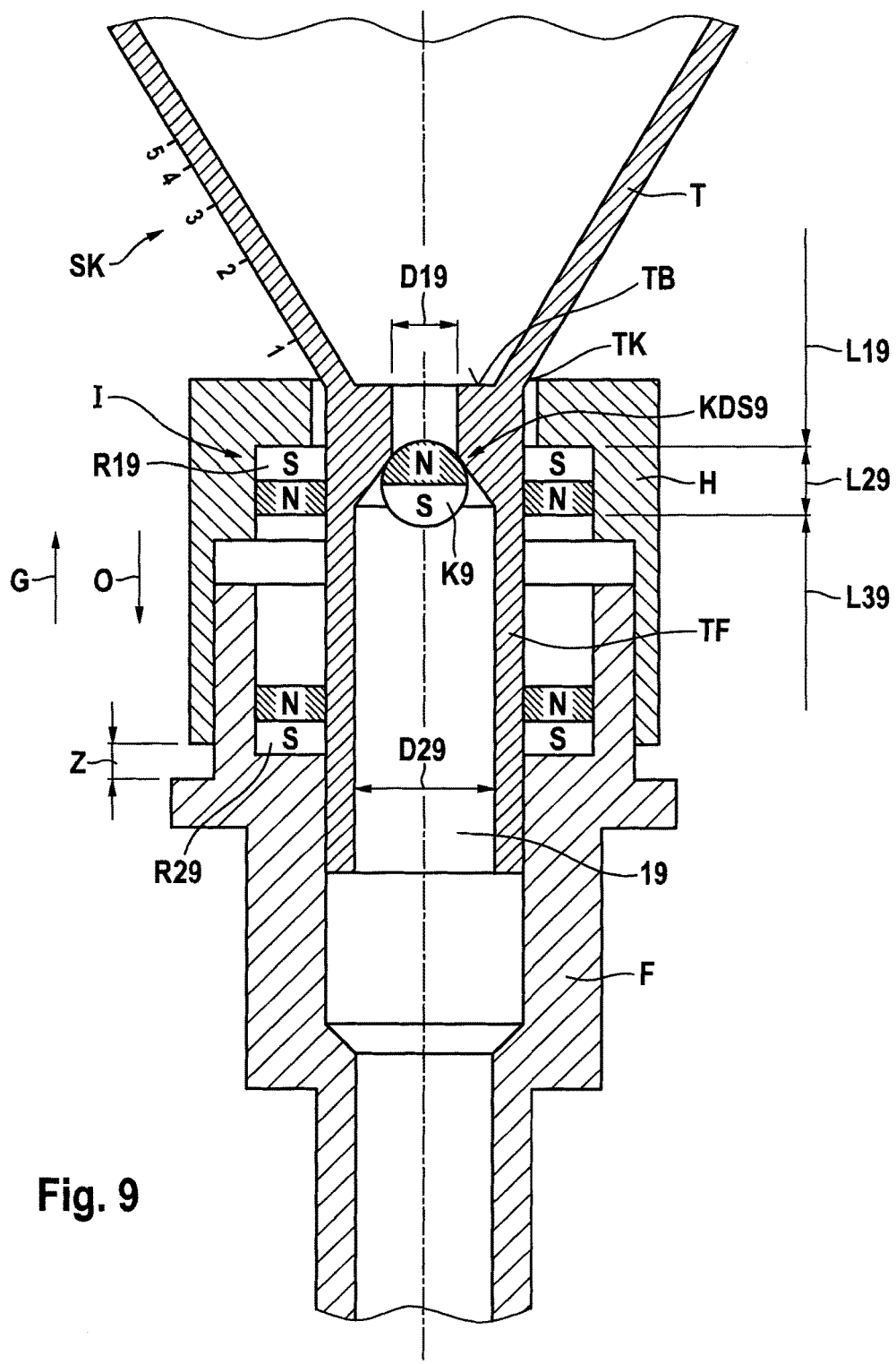
FIG. 9 is a greatly simplified sectional view of a further embodiment of the flow control device according to the invention which is arranged on a funnel with the flow channel closed (position I).

FIG. 9 shows a further embodiment of the flow control device according to the invention which is arranged on a funnel T. The funnel bears a measuring scale SK on the left side (in the drawing) which is used, e.g. for quantitative determination, during sampling. The funnel merges at its base TB into a flow channel 19 which is a first length segment L19, having a first diameter D19, a second length segment L29, in which the flow channel 19 expands conically from the first diameter D19 to a second diameter D29 which is also the diameter of the third length segment L39. A first axially S-N-polarized ring magnet R19 is embedded, as shown, in a sleeve H which encompasses a foot F and is attached so as to be longitudinally displaceable by the distance Z according to the arrows O and G, said sleeve being located in the position I shown in FIG. 9. Axially "opposite" thereto and fixedly arranged in the foot F that is firmly connected to the funnel foot TF, an N-S polarized ring magnet R29 can be seen which thus has reversed polarity compared to the first ring magnet R19 such that the two ring magnets R19 and R29 repel each other. The configuration of the embodiment corresponds in principle to that of the embodiment according to FIG. 1. The polarization of the magnets is also indicated here in each case by the dark hatched portion "N" (i.e. north) and the unhatched portion "S" (i.e. south). The sleeve abuts with its upper end against the collar TK of the funnel T and thus cannot move further away from the foot F than shown. At the transition from the first length segment L19 to the second length segment L29 rests a magnetically N-S polarized closing ball K9 and, sitting in the ball sealing seat KDS9), closes the flow channel 19.

Figure 10:
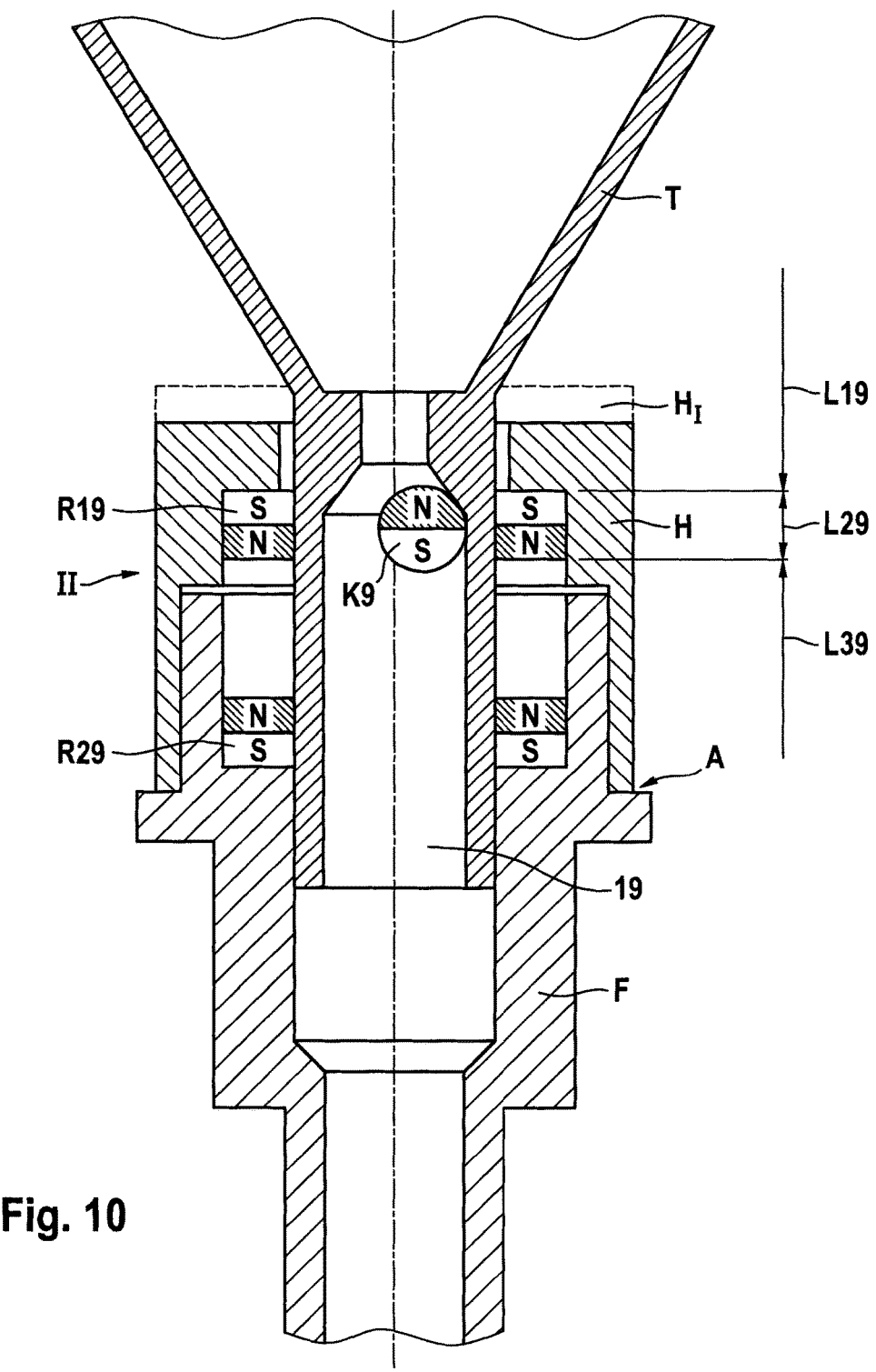
FIG. 10 is a greatly simplified sectional view of the embodiment according to FIG. 9 with the flow channel opened (position II).

If, for example, an operator moves the sleeve H axially against the magnetic force of the second ring magnet R29 in the direction of the arrow O by approximately the distance Z (FIG. 9) into the position II shown in FIG. 10, the first ring magnet R19 takes the magnetic closing ball K9 with it axially in the direction of the arrow O, the closing ball K9 tending radially outwards (into the position K3 analogous to FIG. 5) and moving along the right inner side (in FIG. 9) of the flow channel 19. In so doing, the flow channel 19 is opened. The sleeve H comes to a stop at the point A on the foot F. To close the flow channel 19, the operator only has to let go of the sleeve H to close the flow channel 19 again due to the prevailing magnetic forces.

FIG. 11 is a greatly simplified diagrammatic view of a further embodiment of the flow control device according to the invention, which is similar to the illustration in FIG. 1—here with bar magnets S3D—in the position with the flow channel closed by the ball K as section E-E according to FIG. 13. The possibility of displacing the ring magnet R1 out of the position I in the direction by the distance z in order to open and close the flow channel 1 can clearly be seen. For further details of this, see the description relating to FIG. 1.

FIG. 12 shows the illustration of FIG. 11 as a section F-F according to FIG. 13 in order to explain the respective position of the bar magnets S3D. Here the bar magnets S3D assume the function of the second ring magnet R2 according to FIG. 1.

FIG. 13 shows a plan view of the flow control device according to the invention as well as the position of the section lines E-E and F-F of FIGS. 11 and 12. Four short first bar magnets S2 of identical polarization, as the preloading device VE, are arranged toward the ring magnet R1 every 90° around the center axis MA such that they repel the ring magnet R1. The four slightly longer second bar magnets S3D (FIG. 11), which are also all arranged every 90° but with alternating polarization, can be seen in the gaps between them. The second bar magnets S3D are arranged so far away from the ring magnet R1 that they do not interfere with its regular function as a flow control device. FIG. 12 shows, by way of example, another link pin KS protruding radially outwards on the cylindrical outer surface. This will be discussed in greater detail below.

Figure 14A:
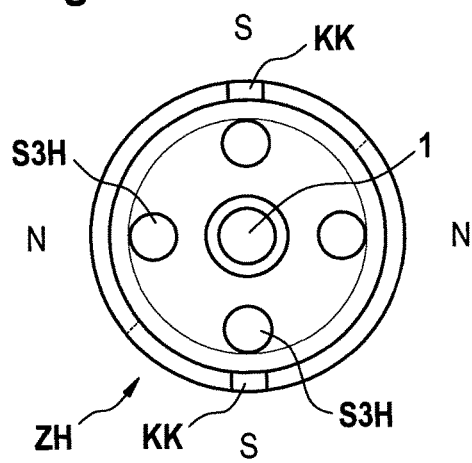
FIG. 14*a* is a plan view of a second half of a bayonet mount configured in the form of a sleeve with four third bar magnets, which are arranged with alternating north-south orientation, as well as link channels arranged in position S in the position when attaching a rotary ring to the sleeve.

FIG. 14a shows a plan view of a second half of a bayonet mount configured in the form of a sleeve with four third bar magnets S3H, which are arranged with alternating north-south orientation in the "12 o'clock position", and two link channels KK arranged in position S in the position when attaching a flow control device configured as the rotary ring DR (FIG. 14b) to the sleeve H. The north poles of the magnets are drawn here as dark circles, the south poles as light circles.

Figure 14B:
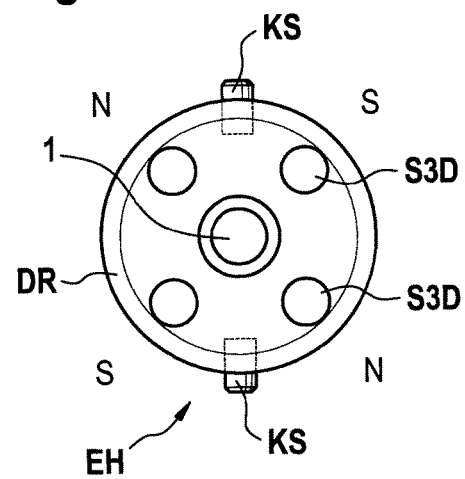
FIG. 14*b* is a plan view of a first half of a bayonet mount configured in the form of the rotary ring with four third bar magnets, which are arranged with alternating north-south orientation, as well as link pins arranged between N and S when attaching the rotary ring to the sleeve.

FIG. 14b shows a plan view of a first half EH of a bayonet mount BV configured in the form of a rotary ring DR with four third bar magnets S3D, which are arranged with alternating north-south orientation in the "12 o'clock position", as well as link pins KS arranged between N and S when attaching the rotary ring DR to the sleeve H. The magnetic poles N-N and S-S of the two halves are rotated by 45° with respect to each other and repel each other.

Figure 15A:
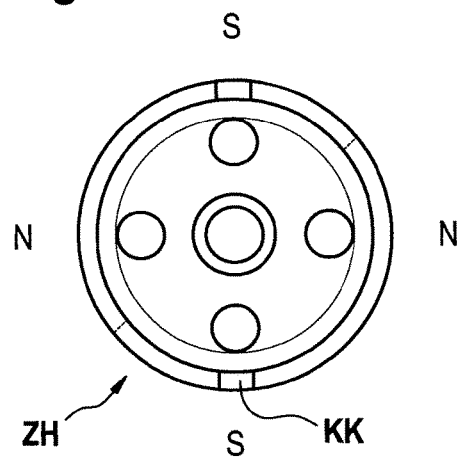
FIG. 15*a* corresponds to the illustration of FIG. 14*a* in the position when attaching the rotary ring to the sleeve.

FIG. 15a corresponds to the illustration of FIG. 14a in the position when attaching the rotary ring to the sleeve.

Figure 15B:
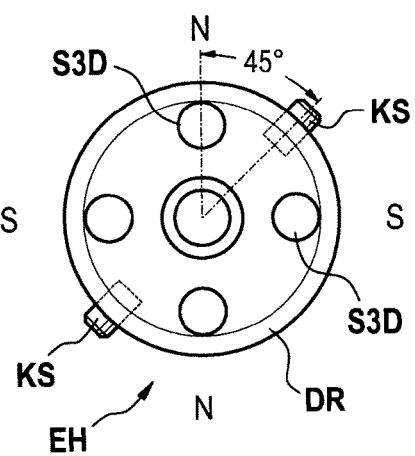
FIG. 15*b* corresponds to the illustration of FIG. 15*a* but in the locked position after attaching the rotary ring to the sleeve.

FIG. 15b corresponds to the illustration of FIG. 15a but in the locked position after attaching the rotary ring to the sleeve. The magnetic poles N-N now lie opposite the axes S-S and attract each other.

It is necessary to imagine bringing together the second halves ZH of the bayonet mount shown in FIGS. 14a and 15a with the first halves EH of the bayonet mount BV shown in FIGS. 14b and 15b in such a way that the parts, in the views lying in the drawing plane, are brought together and are then inserted into each other, the link pins KS being introduced into the link channels KK, then due to the force effect of the third S3D, S3H bar magnets are drawn to each other and as soon as the link pins KS have reached the sliding tracks KB are drawn into them by magnetic force. The bayonet mount BV is released by performing the movement sequences just described in reverse order.

Figure 16A:
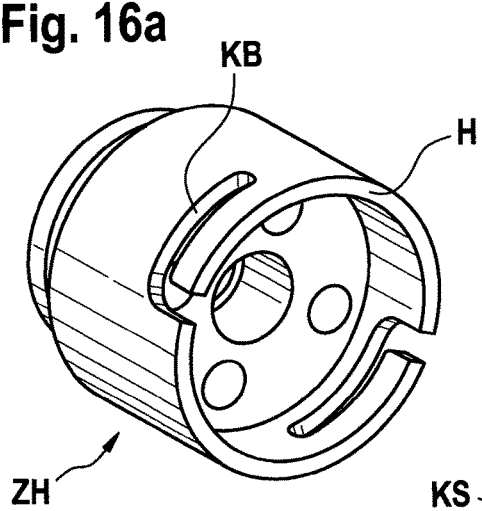
FIG. 16*a* and FIG. 16*b* each show an exploded isometric representation of the rotary situations of the elements shown in FIGS. 14*a* and 14*b* when attaching the rotary ring to the sleeve.
Figure 16B:
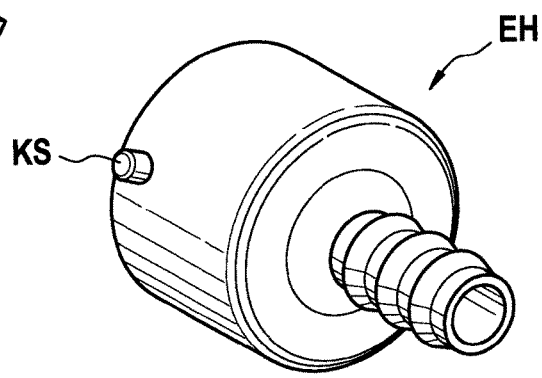
Figure 17A:
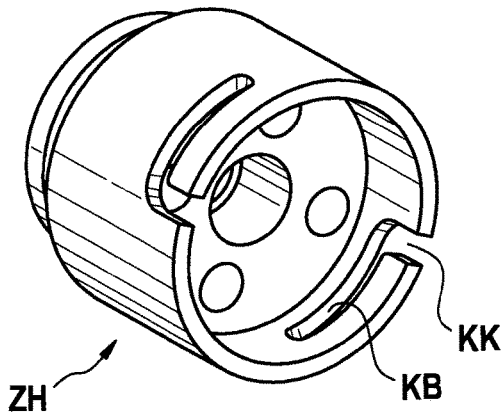
FIG. 17*a* and FIG. 17*b* each show an exploded isometric representation of the rotary situations of the elements shown in FIGS. 15*a* and 15*b* in the locked position after attaching the rotary ring to the sleeve.
Figure 17B:
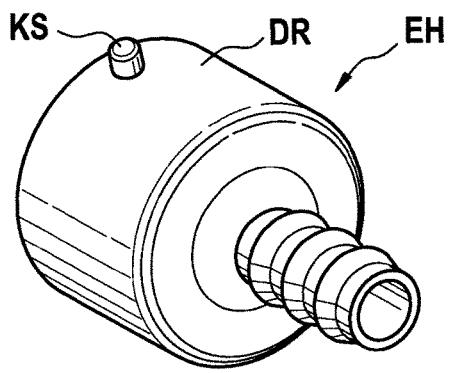

To explain the matter more graphically, FIG. 16a and FIG. 16b each show an exploded isometric representation of the rotary situation of the elements shown in FIGS. 14a and 14b when attaching the rotary ring DR to the sleeve H and FIG. 17a and FIG. 17b each show an exploded isometric representation of the rotary situations of the elements shown in FIGS. 15a and 15b in the locked position after attaching the rotary ring DR to the sleeve H.

In the illustrations of the two halves prior to coupling shown in FIG. 16a and FIG. 16b, the position of the first and second bar magnets (not visible in this illustration in the case of the first half EH) is rotated by 45° relative to each other when the link channels KK and the link pins KS are axially aligned, in a manner analogous to FIGS. 14a and 14b.

In the rotary position of the two halves, after coupling of the two halves, shown in FIG. 16a and FIG. 16b, the bar magnets are axially aligned, in a manner analogous to FIGS. 12a and 12b.

Figure 18:
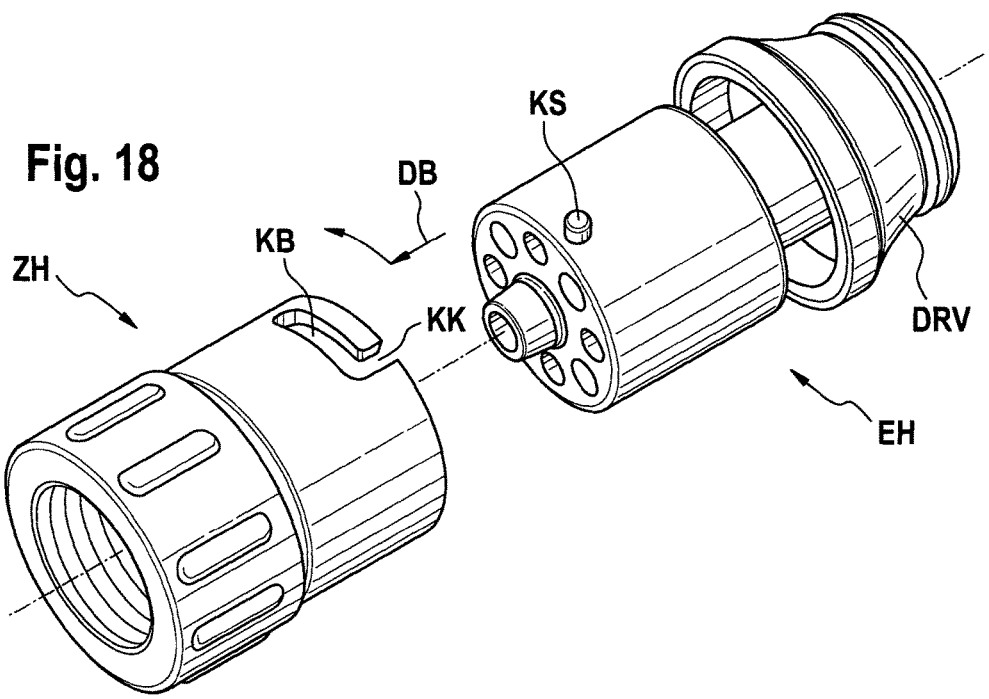
FIG. 18 is an example of a flow control device according to the invention designed as part of a bayonet coupling, prior to coupling, in a perspective representation viewed from the top left.

FIG. 18 shows two halves EH and ZH of a bayonet mount BV, the first half EH also having an integrated flow control device DRV. The two halves are first to be moved towards each other axially according to the arrow DB, the link pin KS being introduced into the link channel KK and subsequently into the sliding track KB with a twisting movement.

Figure 19:
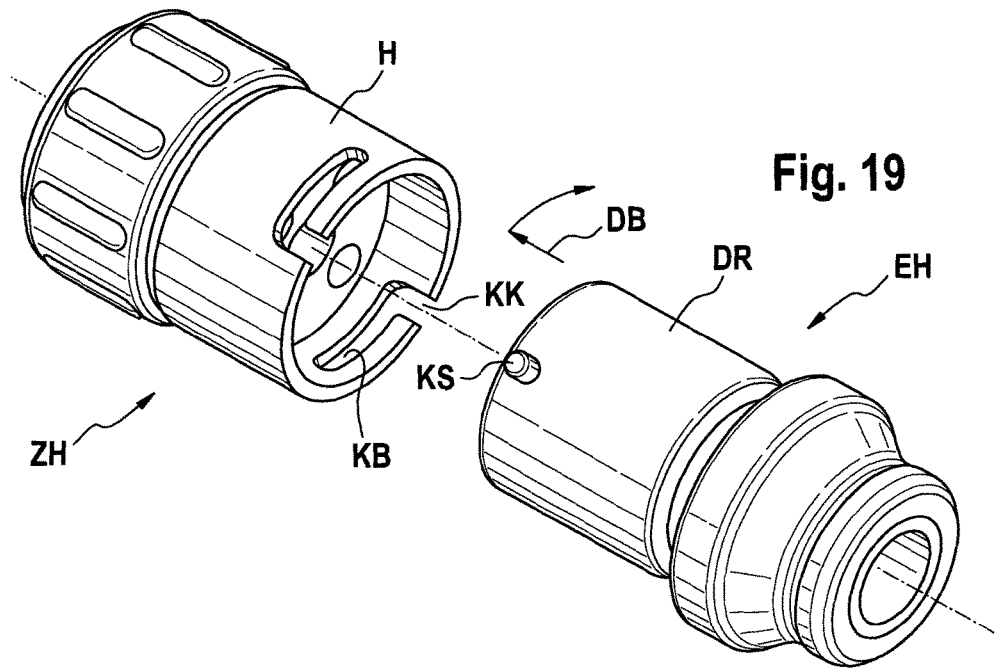
FIG. 19 is an example of a flow control device according to the invention designed as part of a bayonet coupling, prior to coupling, in a perspective representation viewed from the top right.

FIG. 19 shows the situation according to FIG. 18 prior to coupling in a perspective representation viewed from the top right, while also affording a view into the interior of the sleeve.

The invention claimed is:
1. Flow control device, characterized by
   a) a flow channel (1) composed of non-magnetic material having a center axis (MA), with
      aa) a first length segment (L1) having a first diameter (D1),
      ab) a second length segment (L2), wherein the flow channel (1) expands conically from the first diameter (D1) to a second diameter (D2) in the second length segment (L2), and
      ac) a third length segment (L3),
   b) a magnetic closing ball (K), which is movably arranged in the second and third length segments (L2, L3) and has a ball diameter (DK) that lies between the first and the second diameters (D1, D2),
   c) a first, axially polarized (north-south) ring magnet (NSRM), which is oriented centrally in the center axis (MA) and is arranged so as to be longitudinally movable along the center axis and has an inside diameter (RMDI) that is greater than the outside diameter of the flow channel (1) in the third length segment (L3),
   d) a preloading device (VE), which axially urges the north-south-polarized first ring magnet (NSRM) toward the first length segment (L1), and
      characterized in that the preloading device (VE) is designed as a reverse-axially-polarized second (south-north) ring magnet (R2), supported on the flow channel (1), which is oriented centrally to the first ring magnet (R1) on the center axis (MA).

2. Flow control device according to claim 1, characterized in that the flow channel (1) in the conical second length segment (L2) is designed inside as a soft ball sealing seat (KDS) for the magnetic closing ball (K).

3. Filling funnel, characterized by a flow control device according to claim 1.

4. Filling funnel according to claim 3, characterized in that it bears a scale displaying the funnel filling level.

5. Filling funnel according to claim 3, characterized in that it comprises a centering device for container connections.

6. Spigot for a container, characterized by a flow control device according to claim 1.

7. Flow control device, characterized by
a) a flow channel (1) composed of non-magnetic material having a center axis (MA), with
   aa) a first length segment (L1) having a first diameter (D1),
   ab) a second length segment (L2), wherein the flow channel (1) expands conically from the first diameter (D1) to a second diameter (D2) in the second length segment (L2), and
   ac) a third length segment (L3),
b) a magnetic closing ball (K), which is movably arranged in the second and third length segments (L2, L3) and has a ball diameter (DK) that lies between the first and the second diameters (D1, D2),
c) a first, axially polarized (north-south) ring magnet (NSRM), which is oriented centrally in the center axis (MA) and is arranged so as to be longitudinally movable along the center axis and has an inside diameter (RMDI) that is greater than the outside diameter of the flow channel (1) in the third length segment (L3),
d) a preloading device (VE), which axially urges the north-south-polarized first ring magnet (NSRM) toward the first length segment (L1), and
   characterized in that the preloading device (VE) is designed as an axially-polarized third (north-south) ring magnet (R3), supported on the flow channel, which is oriented centrally on the center axis (MA), wherein a spacer (AH) is arranged between the two mutually attracting ring magnets.

8. Flow control device according to claim 7, characterized in that the flow channel (1) in the conical second length segment (L2) is designed inside as a soft ball sealing seat (KDS) for the magnetic closing ball (K).

9. Filling funnel, characterized by a flow control device according to claim 7.

10. Filling funnel according to claim 9, characterized in that it bears a scale displaying the funnel filling level.

11. Filling funnel according to claim 9, characterized in that it comprises a centering device for container connections.

12. Spigot for a container, characterized by a flow control device according to claim 7.

13. Flow control device, characterized by
a) a flow channel (1) composed of non-magnetic material having a center axis (MA), with
   aa) a first length segment (L1) having a first diameter (D1),
   ab) a second length segment (L2), wherein the flow channel (1) expands conically from the first diameter (D1) to a second diameter (D2) in the second length segment (L2), and
   ac) a third length segment (L3),
b) a magnetic closing ball (K), which is movably arranged in the second and third length segments (L2, L3) and has a ball diameter (DK) that lies between the first and the second diameters (D1, D2),
c) a first, axially polarized (north-south) ring magnet (NSRM), which is oriented centrally in the center axis (MA) and is arranged so as to be longitudinally movable along the center axis and has an inside diameter (RMDI) that is greater than the outside diameter of the flow channel (1) in the third length segment fL3),
d) a preloading device (VE), which axially urges the north-south-polarized first ring magnet (NSRM) toward the first length segment (L1), and
   characterized in that the preloading device (VE) is designed as at least two first (south-north) bar magnets (S2), supported on the flow channel, which are grouped around the center axis (MA) and reverse-axially-polarized in relation to the first ring magnet (R1).

14. Flow control device according to claim 13, characterized in that
a first half (EH) of a bayonet mount (BV) in the form of a rotary ring (DR), which is directed away from the first length segment (L1), is arranged in the third length segment (L3) and that
four evenly spaced second bar magnets (S3D) with alternating north-south orientation, supported on the flow channel, are arranged in the rotary ring (DR) about the center axis (MA), and that
the rotary ring (DR) has at least one link pin (KS) protruding radially outwards from its periphery.

15. Flow control device according to claim 14, characterized in that
assigned to the first half (EH) is a second half (ZH) of a bayonet mount (BV), which can be releasably connected to said first half, in the form of a sleeve (H) with at least one sliding track (KB) integrated in its wall (W), wherein the sleeve (H) has four evenly spaced third bar magnets (S3F) with alternating north-south orientation about its center axis (MA),
wherein the rotary ring (DR) is dimensioned in such a manner that it fits into the interior of the sleeve (H) of the second half (EH),
wherein the sliding track (KB) in the wall (W) runs peripherally in a circular arc of 45° and is connected to at least one link channel (KK) extending axially from the end of the sleeve (H) to the sliding track (KB) in the wall (W) and merging into it,
wherein the position of the second and third bar magnets is rotated by 45° relative to each other when the at least one link channel (KK) and the at least one link pin (KS) are axially aligned.

16. Flow control device according to claim 15, characterized in that it has two sliding tracks (KB) and link channels (KK) respectively integrated in its wall (W), which are situated opposite each other in respect of the center axis (MA).

17. Flow control device according to claim 15, characterized in that the first half (EH) of a bayonet mount (BV) and the second half (ZH), which can be releasably connected thereto, have devices (ED) for mutually centering and sealing the flow channel.

18. Flow control device according to claim 13, characterized in that the preloading device (VE) is designed as four first (south-north) bar magnets (S2), supported on the flow channel, which are grouped around the center axis (MA) and reverse-axially-polarized in relation to the first ring magnet (R1).

* * * * *

UNITED STATES PATENT AND TRADEMARK OFFICE
CERTIFICATE OF CORRECTION

PATENT NO. : 10,359,125 B2
APPLICATION NO. : 15/564606
DATED : July 23, 2019
INVENTOR(S) : Peter Hübner It is certified that error appears in the above-identified patent and that said Letters Patent is hereby corrected as shown below:

On the Title Page

Item (71), Applicants: "Bürkle GmbH, Bad Bellingen (DE); Anna Henning, Lörrach-Brombach (DE)" should read -- Bürkle GmbH, Bad Bellingen (DE) --

In the Claims

Column 12, Line 4, "fL3" should read -- L3 --

Signed and Sealed this
Eighteenth Day of February, 2020

Andrei Iancu
*Director of the United States Patent and Trademark Office*